Dec. 27, 1927.
W. B. SCHULTE
RADIO BATTERY
Filed April 8, 1924
1,654,145
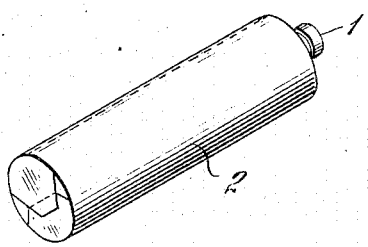
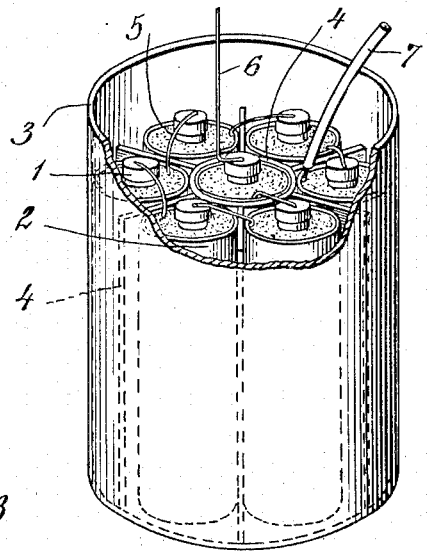
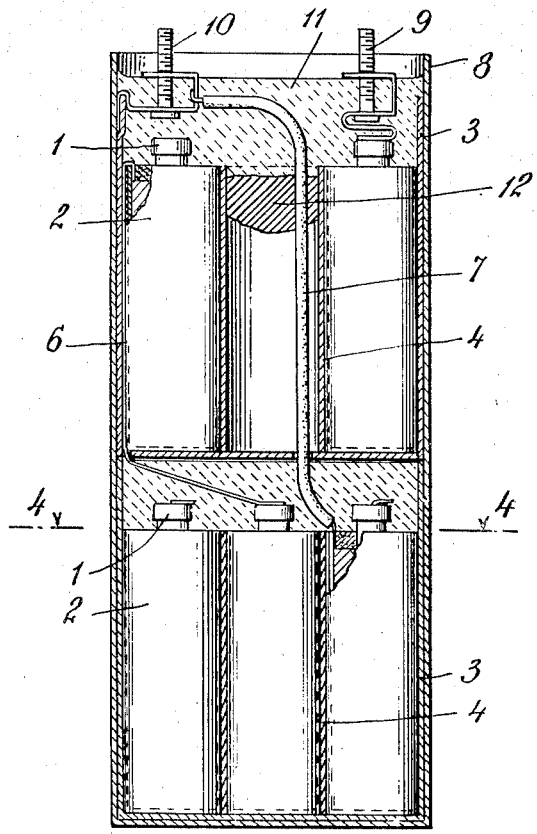
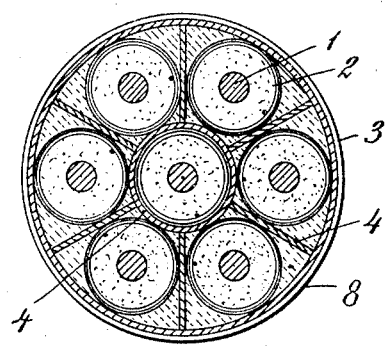
INVENTOR
Walter B. Schulte
BY
Pennie, Davis, Marvin & Edmonds
ATTORNEYS Patented Dec. 27, 1927.

1,654,145

UNITED STATES PATENT OFFICE.

WALTER B. SCHULTE, OF MADISON, WISCONSIN, ASSIGNOR TO BURGESS BATTERY COMPANY, OF MADISON, WISCONSIN, A CORPORATION OF WISCONSIN.

RADIOBATTERY.

Application filed April 8, 1924. Serial No. 704,903.

This invention relates to dry batteries of a type useful in the radio art where a plurality of cells of relatively small size must be grouped together in a limited space to make available a relatively high terminal voltage. Such batteries are commonly used on the so-called "B" circuit of radio-receiving sets. The present invention comprises certain improvements in the grouping and assembly of the several cells of a battery whereby there is provided a battery which though having a voltage of say 20 to 40 volts is of about the size and shape of an ordinary standard or No. 6 dry cell, and has its terminals at the top so that it can be grouped with standard dry cells when that course seems desirable for compact storage of all of the battery equipment within the limited confines of a radio-receiving cabinet. That is to say, the completed battery of relatively high voltage is of about the size and of about the appearance of an ordinary single 6" cylindrical cell.

The usual practice in making batteries for use on the "B" circuit of a radio-receiving set is to arrange a number of cells within individual compartments of a casing and to space the cells from one another by means of an egg case tray. The cells are connected in series, and the cell electrodes and cross connections are covered up with a fusible sealing compound. Terminals projecting out through the sealing compound are connected to the end cells, and when the battery stands in normal position with the cells upright, these terminals are exposed and are liable to accidental short-circuit. Such units now being used in large numbers in radio-receiving sets are of inconvenient proportions and cannot readily be grouped with one another in the limited space ordinarily available in the radio cabinet. But in addition, the standard or 6" dry cells, now being used extensively for the "A" circuit of wireless receiving sets, are so different in shape and proportions that they cannot easily be grouped with the "B" batteries in the mechanical work of installing them in a limited space. Standing the "B" battery on end does not remedy the difficulty because of the exposed condition and inconvenient arrangement of its widely separated terminals.

One of the principal objects of this invention is to provide a battery of that type commonly known as a "B" battery which is of about the size and shape of a standard No. 6 cylindrical dry cell.

In the accompanying drawings:

Fig. 1 is a perspective view of a dry cell wrapped in wax paper and ready for assembly into a unit;

Fig. 2 shows a unit of seven cells connected in series and ready for the addition of its sealing compound;

Fig. 3 is a vertical section through a complete battery containing two units of the type shown in Fig. 2, and Fig. 4 is a transverse section taken on the line 4—4 of Fig. 3.

The individual cells of this battery may be made in the usual manner with a zinc cup serviceable as one electrode and a carbon rod serving as the other electrode and provided with a brass contact cap. To guard against leakage of current from one cell to an adjacent cell and to secure freedom from noise in the receiving set, the best practice known to me is to cover each cell with a water-repellant material as by wrapping it in waxed paper and folding the bottom down across the bottom of the cell as shown in Fig. 1 and as described in detail in my Patent No. 1,408,140 issued February 28, 1922. In Fig. 1, the numeral 1 represents a capped carbon electrode, and 2 is the waxed paper wrapping.

In making the improved battery from these cells, I assemble the cells into two units, each unit containing a plurality of cells electrically connected in series. Fig. 2 shows such a unit containing seven cells arranged in such manner that they can be accommodated in a cylindrical carton 3. The cells 2 are preferably separated by partitions 4 made of paraffined paste-board interlocked in somewhat the same manner as the partitions of an egg case tray. These partitions divide the interior of the carton 3 into separate compartments in which the cells are positioned. Cross connections 5 of wire soldered at one end to a zinc electrode and soldered at the other end to the brass cap of a carbon electrode are used to electrically connect the cells in any desired arrangement. In Fig. 2, the cells are shown as being connected in series but they can be connected in series multiple if the demand for current from the battery were such as to justify that arrangement. A flexible conductor 6 is soldered to the carbon electrode of one end cell and a second flexible conductor 7 is soldered to the negative electrode of the other end cell. The unit is then ready for testing and if the cells are found to be in good condition, the open top of the carton is sealed by pouring in a molten sealing compound, such as the usual rosin sealing wax. This seal covers up the cell electrodes and their cross connections and makes a tight joint around the flexible lead wires.

Each dry cell of the unit has a voltage of about 1.5 volts, and consequently, to get a battery having a terminal voltage between 20 and 40 volts, it is necessary to connect at least two of the units in series. Fig. 3 shows a casing containing two of such units connected in series. In this figure, the numeral 8 represents a cylindrical casing preferably of paraffined cardboard and having an internal diameter slightly larger than the external diameter of the carton 3. A unit assembled, prepared and sealed, as described above, is dropped into place in the bottom of the casing 8. A second unit similar to the first but unsealed at the top is then inserted in the casing 8 and a soldered connection is made between one of its terminals, and the conductor 6 of the lowermost unit, thereby establishing a series connection between the two units. The conductors 5 and 6 may be brought up past the upper unit in any suitable manner. For instance, the second or top unit may have its center cell omitted, as shown in Fig. 3, in order to provide a convenient space through which one or both of the conductors 6 and 7 may pass. In this event, these conductors may be passed through holes in the bottom of the carton 3 of the upper unit. I prefer, however, to pass only the conductor 7 through the space formed by the omission of the center cell and to pass the other conductor up through that one of the cell compartments which contains the cell to which it is to be connected, as shown in Fig. 3. This keeps the conductors well separated and insulated from each other. When the conductors are separated in this manner, it is not necessary to insulate the conductor 6 and therefore it may be easily accommodated in the cell compartment through which it passes. The omission of the center cell however is not necessary as the conductors 6 and 7 may be brought up at any points between the cells or may be brought up outside of the carton 3 of the upper unit in which event they will lie between the carton 3 and the outer casing 7. The end cell of the upper unit may have a binding post 9 soldered directly to the metal cap of the carbon electrode. Likewise, the conductor 7 which is connected to the negative electrode of the end cell of the lower unit may be soldered to a second binding post 10. Sealing compound 11 may then be poured in to close the open end of the casing 8 and to serve as means for supporting and anchoring the binding posts 9 and 10. Before the sealing compound is thus poured in the casing 8, the upper part of the opening formed by the omission of the center cell of the upper unit may be closed in any suitable way, as by means of a cotton wad or plug 12. The binding posts 9 and 10 may each comprise a vertical threaded stud soldered to one leaf of a U-shaped sheet brass piece, the upper leg of which is intended to lie substantially flush with the top of the sealing compound 11 and the lower leg of which is intended to be embedded in the sealing compound. The invention is not limited to the employment of any particular type of binding post or terminal, for various types, such as Fahnstock clips, spring clips and threaded studs may be used.

If desired, the upper unit may be made identical with the lower unit and may be sealed before it is placed in the casing 7. Then, after the conductors are connected in the proper manner to electrically connect the two units, and after the units have been placed in the casing 7, the final layer of sealing compound may be applied. The terminal leads or conductors, in this instance, may or may not be connected to binding posts supported in the final layer of sealing compound.

The battery described herein being of substantially the same size and shape as a standard No. 6 cylindrical dry cell can be placed on a table with other electrical devices without taking up substantially more table-room than would be required for the ordinary standard No. 6 cell. The improved battery can also be conveniently grouped and arranged with the No. 6 cylindrical dry cells that are usually used for "A" batteries, because it is of substantially the same size and shape as such "A" batteries. Similarly, radio cabinets can be designed to house in a minimum space both the cylindrical "A" batteries and the "B" batteries of the set, for by my present invention all of the batteries are of the same general size and contour and all can be conveniently arranged on end side by side in the cabinet.

It is to be understood that this invention is not limited to the particular embodiment illustrated and described but includes such modifications thereof as properly fall within the language and spirit of the appended claims. Many of the details of the improved battery, such as the size and number of cells, the mode of insulating the cells one from another in the units, the kind, number and arrangement of terminals, or binding posts, may be modified without departing from the spirit of the invention.

I claim:—

1. An electric battery comprising a cylindrical casing having a depth at least twice as great as the diameter thereof, a plurality of electrically connected preformed units arranged therein one on top of the other, each of said units comprising a cylindrical carton and a plurality of individual cells in the carton electrically insulated from one another, electrical connections connecting at least some of said cells in series, terminals at the top of said casing electrically connected to the cells, and a mass of sealing material in the top of each of said cartons covering the tops of the cells therein, the sealing material at the top of the uppermost carton serving as a seal for the casing.

2. An electric battery comprising a cylindrical casing, and a plurality of electrically connected units arranged in vertical alignment in said casing, each of said units comprising a cylindrical carton, radially disposed partitions of insulating material in said carton electrically connected cells disposed between said partitions and a mass of fusible sealing material at the top of said carton extending over the tops of said cells.

3. An electric battery comprising a plurality of electrically connected units disposed in vertical alignment in a cylindrical casing, one, at least, of said units comprising a cylindrical carton of insulating material, a cylindrical insulating partition of smaller diameter than said carton concentrically disposed within said carton, a plurality of radially disposed insulating partitions extending between said cylindrical partition and said carton, an electric cell disposed within said cylindrical partition, and a plurality of electric cells disposed between said radial partitions, all of said cells being electrically connected.

4. An electric battery comprising a plurality of electrically connected units disposed in vertical alignment in a cylindrical casing, each of said units comprising a cylindrical carton of insulating material, a plurality of radially disposed vertical partitions in said carton, electrically connected cells disposed between said partitions and a mass of sealing material in the upper end of said carton extending over the upper ends of said cells and securing said cells in said carton.

5. An electric battery comprising a plurality of electrically connected units disposed in vertical alignment in a cylindrical casing, one, at least, of said units comprising a cylindrical carton of insulating material, a cylindrical insulating partition of smaller diameter than said carton concentrically disposed within said carton, a plurality of radially disposed insulating partitions between said cylindrical partition and said carton, an electric cell enclosed within said cylindrical partition, electric cells disposed between adjacent radial partitions, all of said cells in each unit being electrically connected, and sealing material covering the upper ends of each of said cartons and of said casing.

6. An electric battery comprising a plurality of electrically connected units disposed in vertical alignment in a casing, each of said units comprising a carton of insulating material, a plurality of vertical insulating partitions disposed within said carton, and electric cells disposed between at least some of the adjacent partitions, all of said cells in each unit being electrically connected, an electrical conductor connected to one of the cells of the lowermost unit and extending to the top of the casing, said conductor passing through said upper unit between the insulating partitions therein.

7. An electric battery comprising a plurality of electrically connected units disposed in vertical alignment in a casing, each of said units comprising a carton of insulating material and a plurality of vertical insulating partitions disposed therein to form insulating compartments, electrically connected cells disposed in said insulated compartments of said units, an electrical conductor connected to one of the cells of one of said units and extending to the top of said casing, said conductor passing through one of said insulated compartments of another unit from which the electric cell is omitted.

8. An electric battery comprising two units disposed in vertical alignment in a casing, each of said units comprising a carton of insulating material and a plurality of vertical insulating partitions disposed within said carton to form insulated compartments therein, electrically connected cells disposed in the compartments of the lower unit and electrically connected cells disposed in all but one of the compartments of the upper unit, a fusible sealing material sealing said cells in said cartons and sealing said cartons in said casing, terminals secured at the top of said casing in said sealing material and electric conductors connecting said units and said terminals, at least one of said conductors passing through said compartment in said upper unit which is not occupied by a cell.

In testimony whereof I affix my signature.

WALTER B. SCHULTE.